(12) United States Patent  (10) Patent No.: US 7,058,072 B1
Ikeda  (45) Date of Patent: Jun. 6, 2006

(54) APPARATUS AND METHOD FOR ESTABLISHING DIAL-UP BRANCH CONNECTIONS TO INTERNET SERVICE PROVIDERS

(75) Inventor: Saburou Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1066 days.

(21) Appl. No.: 09/611,342

(22) Filed: Jul. 6, 2000

(30) Foreign Application Priority Data

Jul. 9, 1999 (JP) ................................. 11-196694

(51) Int. Cl.
*H04L 12/28* (2006.01)
(52) U.S. Cl. ...................... 370/422; 370/360; 370/398
(58) Field of Classification Search ................ 370/352, 370/353, 355, 422, 360, 535
See application file for complete search history.

(56) References Cited

U.S. PATENT DOCUMENTS

| | | | | |
|---|---|---|---|---|
| 5,541,917 A | * | 7/1996 | Farris | 370/352 |
| 5,787,072 A | * | 7/1998 | Shimojo et al. | 370/231 |
| 5,923,671 A | * | 7/1999 | Silverman | 370/542 |
| 5,938,726 A | * | 8/1999 | Reber et al. | 709/217 |
| 6,049,602 A | * | 4/2000 | Foladare et al. | 379/265.04 |
| 6,145,002 A | * | 11/2000 | Srinivasan | 709/225 |
| 6,490,273 B1 | * | 12/2002 | DeNap et al. | 370/352 |
| 6,600,741 B1 | * | 7/2003 | Chrin et al. | 370/375 |

FOREIGN PATENT DOCUMENTS

| | | |
|---|---|---|
| JP | 9-284390 | 10/1997 |
| JP | 10-336345 | 12/1998 |

OTHER PUBLICATIONS

Japanese Office Action dated Sep. 18, 2003 with partial English translation.
Jo-bu, S., (Commence providing a "Navigation dial service"), NTT technology Journal, vol. 9, No. 7, pp. 118-119, Jul. 1, 1997.

* cited by examiner

*Primary Examiner*—Brian Nguyen
*Assistant Examiner*—Tri H. Phan
(74) *Attorney, Agent, or Firm*—McGinn IP Law Group, PLLC (57) ABSTRACT

A connection apparatus for a public network switching system includes line ports connected to user terminals and trunk ports connected to Internet lines, a switching unit having diverging ports connected to the trunk ports and converging ports connected to the line ports. A control unit receives a request signal from a user terminal and establishes connections between one of the diverging ports and the converging ports which correspond to Internet lines specified by the request signal. The public network switching system connects the one diverging port to the user terminal and connects a line port and a trunk port.

18 Claims, 5 Drawing Sheets

APPARATUS AND METHOD FOR ESTABLISHING DIAL-UP BRANCH CONNECTIONS TO INTERNET SERVICE PROVIDERS

BACKGROUND OF THE INVENTION

1. Field of the Invention

The present invention relates generally to dial-up connection to internet service providers, and more particularly to an apparatus and method for accessing multiple internet service providers at low cost by using dial-up IP (internet protocol) service.

2. Description of the Related Art

Dial-up IP service allows subscribed user terminals to establish dial-up connections to internet service providers through a public switched telephone network. To provide this service, internet service providers are connected to the public switched telephone network through dial-up lines that are leased from the network provider and assigned phone numbers as in the case of most telephone subscribers. The total number of such leased lines is less than the number of subscribed users in order to establish a reasonable balance between operating cost and profit. However, communication traffic offered to the leased lines as well as to the public switched network will increase significantly when flat rate service is introduced for dial-up connections. In addition, since dial-up users are connected to internet service providers in a one-to-one correspondence, it is necessary for the internet service providers to install equipment in the public switched network that can communicate with the subscribers' modems with perfect compatibility. Further, due to communication protocols and transmission speeds of the installed equipment, the leased lines must be grouped according to such different implementation parameters and reassigned new phone numbers (i.e., pilot numbers) to maintain compatibility. The subscribers must be informed of the reassigned phone numbers to update their internet access number. Since different pilot numbers are used for different groups of leased lines, a split loss occurs in the utilization efficiency of transmission medium. This is particularly true of ADSL (asymmetric digital subscriber line) since the number of lines leased for this service is significantly limited.

SUMMARY OF THE INVENTION

It is therefore an object of the present invention to provide an apparatus and method for accessing multiple internet service providers with low access charges without generating an extra load on the traffic of public switched network.

According to a first aspect, the present invention provides a connection apparatus for a public network switching system which serves user terminals. The apparatus comprises a switching unit having a plurality of diverging ports connected to the switching system and a plurality of converging ports adapted for connection to a plurality of internet lines, and a control unit for receiving a request signal of one of the user terminals and establishing in the switching unit a set of branch connections between one of the diverging ports and ones of the converging ports corresponding to the internet lines specified by the request signal, the one diverging port being connected through a connection to the one user terminal established in the switching system. The switching system may be configured to serve a plurality of internet lines, and the control unit is configured to request the switching system to establish a plurality of connections between the converging ports and the plurality of internet lines.

Each of the converging ports may include a multiplexer for multiplexing a plurality of user signals into a signal for transmission to one of the internet lines and a demultiplexer for demultiplexing a signal from the internet line into a plurality of signals for application to the diverging ports.

According to a second aspect, the present invention provides a connection apparatus for a public network switching system which serves user terminals via a plurality of ADSL (asymmetric digital subscriber line) modems. The apparatus comprises a switching unit having a first plurality of diverging ports connected to the switching system, a second plurality of diverging ports connected to the ADSL modems, and a plurality of converging ports adapted for connection to a plurality of internet lines, and a control unit for receiving a request signal of one of the user terminals and establishing in the switching unit a first set of branch connections between one of the first plurality of diverging ports and ones of the converging ports corresponding to the internet lines specified by the request signal and a second set of branch connections between one of the second plurality of diverging ports and the ones of the converging ports, the one of the first plurality of diverging ports being connected through a connection established in the switching system to one of the ADSL modems associated with the one user terminal from which the request signal is received.

According to a third aspect, the present invention provides a communication system comprising a public network switching system for establishing a connection between a first plurality of ports to which a plurality of user terminals are connected and a second plurality of ports in response to a request signal from one of the user terminals, a switching unit having a plurality of diverging ports connected to the second plurality of ports of the switching system and a plurality of converging ports adapted for connection to a plurality of internet lines, and a control unit responsive to the request signal for establishing in the switching unit a set of branch connections between one of the diverging ports and ones of the converging ports corresponding to the internet lines specified by the request signal, the one diverging port being connected to the one user terminal through the connection established in the switching system.

According to a fourth aspect, the present invention provides a method of communication for a public network switching system which serves user terminals by using a switching unit having a plurality of diverging ports connected to the switching system and a plurality of converging ports adapted for connection to a plurality of internet lines. The method comprises the steps of (a) receiving a request signal of one of the user terminals, (b) establishing in the switching system a connection between the one user terminal and one of the plurality of diverging ports in response to the request signal, (c) establishing in the switching system a plurality of connections in the public network switching system between ones of the plurality of converging ports and the plurality of internet lines according to phone numbers of internet service providers contained in the request signal, (d) establishing in the switching unit a set of branch connections between the one diverging port and the ones of the converging ports, and (e) repeating the steps (a), (b) and (d) by skipping the step (c) if connections are already established in the public network switching system.

BRIEF DESCRIPTION OF THE DRAWINGS

The present invention will be described in further detail with reference to the accompanying drawings, in which.

DETAILED DESCRIPTION

Figure 1:
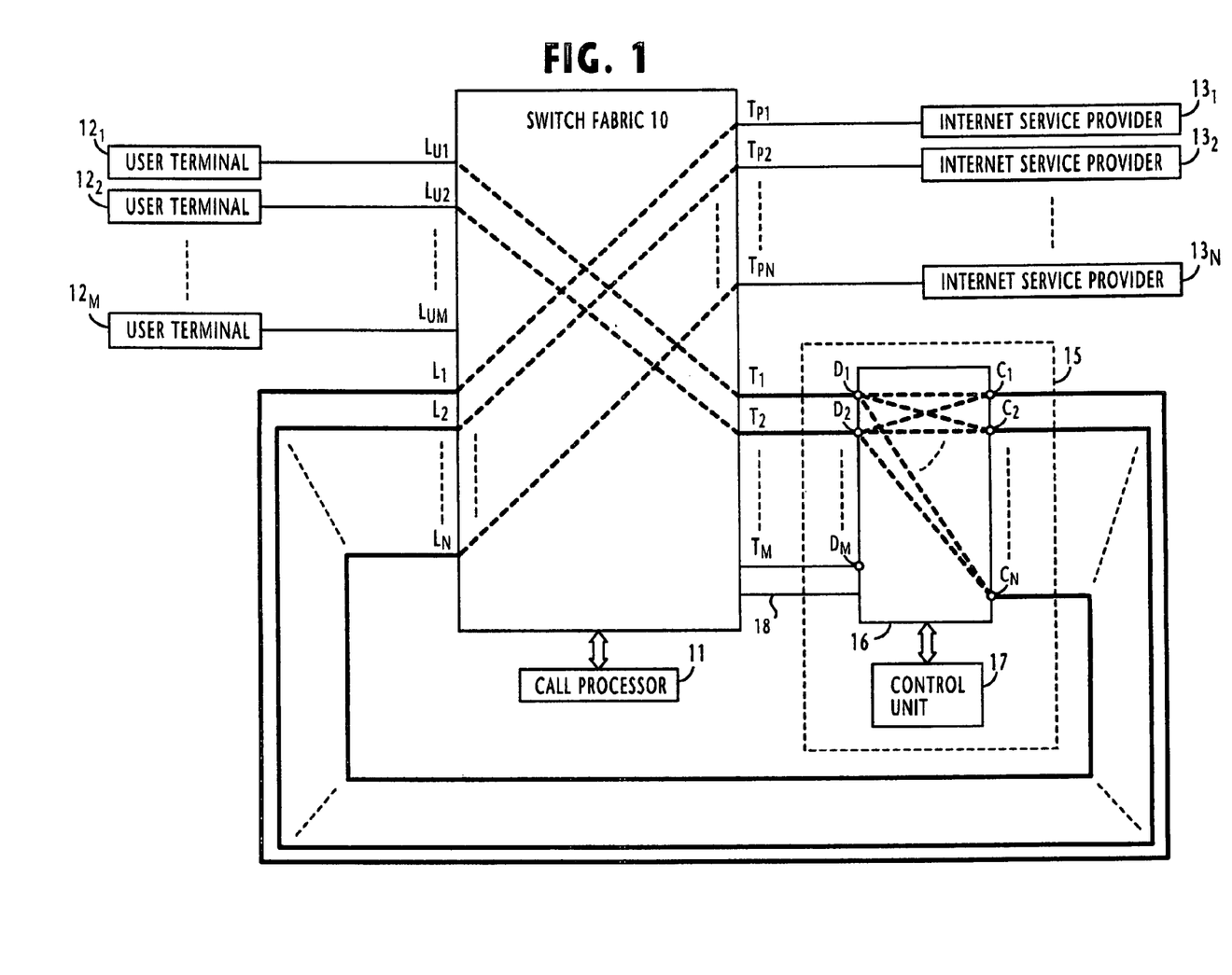
FIG. 1 is a block diagram of a communication network incorporating a branch connection apparatus of the present invention.

In FIG. 1, a communication network is illustrated as comprising a switch fabric 10 and a call processor 11 which together form an essential part of a PSTN (public switched telephone network) local switching office. Switch fabric 10 has a plurality of line ports $L_{U1} \sim L_{UM}$ (or subscriber line interfaces) connected respectively to user terminals $12_1 \sim 12_M$ and a plurality of trunk ports $T_{P1} \sim T_{PN}$ (or trunk interfaces) respectively connected to the transmission lines of internet service providers $13_1 \sim 13_N$. For simplicity, the trunk ports are provided one for each internet service provider. More than one trunk port may be provided for each internet service provider.

According to the present invention, a branch connection apparatus 15 is provided. Branch connection apparatus 15 may be co-located with the switching system of the local switching office or located outside of the switching office in an appropriate housing unit. Branch connection apparatus 15 includes a switching unit 16 and a control unit 17. Switching unit 16 has a plurality of diverging ports $D_1 \sim D_M$ connected to trunk ports $T_1 \sim T_M$ of the switch fabric 10 and a plurality of converging ports $C_1 \sim C_N$ connected to line ports $L_1 \sim L_N$ of the switch fabric 10. The converging ports of the switching unit 16 are provided in a one-to-one correspondence to the internet service providers $13_1 \sim 13_N$. If all user terminals 12 are subscribed to a flat rate service, all diverging ports of switching unit 16 correspond respectively to the user terminals $12_1 \sim 12_M$. Switching unit 16 has a dedicated input port connected via a control line 18 to a line port of the switch fabric 10 through which the control unit 16 communicates with the call processor 11 to set up connections in the switch fabric 10.

Figure 2:
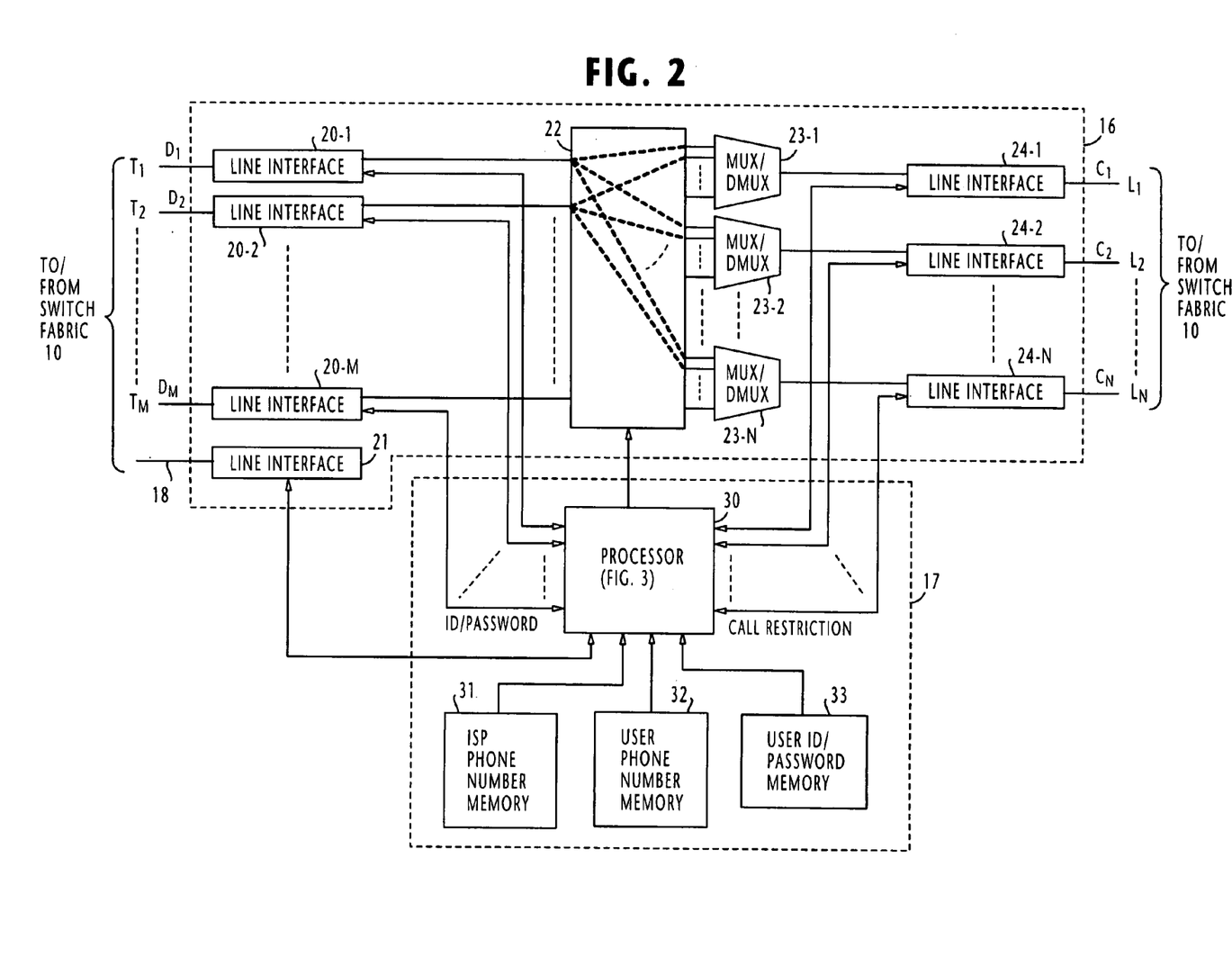
FIG. 2 is a block diagram of the branch connection apparatus of FIG. 1.

As shown in detail in FIG. 2, the switching unit 16 includes a plurality of line interface units 20-1 through 20-M for interfacing the trunk ports of switch fabric 10 to corresponding line ports of a switch fabric 22. Each line interface unit 20 represents the corresponding one of diverging ports $D_1 \sim D_M$. Switch fabric 22 has N sets of trunk ports with which a plurality of multiplexers/demultiplexers 23-1 through 23-N are associated respectively. Each of the multiplexers/demultiplexers has a number of input terminals connected to corresponding trunk ports of the associated set and one output terminal connected to a corresponding one of line interface units 24-1~24-N, which operate in compliance with communication protocols and transmission speeds of the user terminals. These line interface units are connected to line ports $L_1 \sim L_N$ of the switch fabric 10 for interfacing to the internet service providers. Each multiplexer/demultiplexer 23 and corresponding line interface unit 24 represent the corresponding one of the converging ports $C_1 \sim C_N$.

In a preferred embodiment, each multiplexer/demultiplexer is implemented with a processor operating in a TCP/IP (Transmission Control Protocol/Internet Protocol) protocol mode or an ATM (asynchronous transfer mode) mode.

Control unit 17 includes a processor 30 and a number of memories 31 through 33 for storing ISP (internet service provider) phone numbers, user phone numbers, and user identifiers/passwords. Using the memories 31 through 33, the processor 30 determines whether the requesting user is a registered user. Processor 30 communicates with each internet service provider through the line interface units 24 to ascertain that the requesting user is to be allowed access to the Internet. Processor 30 uses a line interface unit 21 to supply a connection setup request to the control processor 11 via the control line 18 when establishing connections in the switch fabric 10.

When one of the user terminals desires to access the Internet, it sends a connection request packet. This packet is received by the call processor 11 of the PSTN switching system and a connection is established in the switch fabric 10 between the line terminal $L_U$ of the calling user and one of the trunk ports $T_1 \sim T_M$. The request packet is passed on through the control line 18 to the line interface unit 21 of the switching unit 16, where it is communicated to the processor 30. The request packet from the calling user contains a number of destination (ISP) phone numbers and the phone number of the calling user terminal. These phone numbers are detected by the processor 30.

Figure 3:
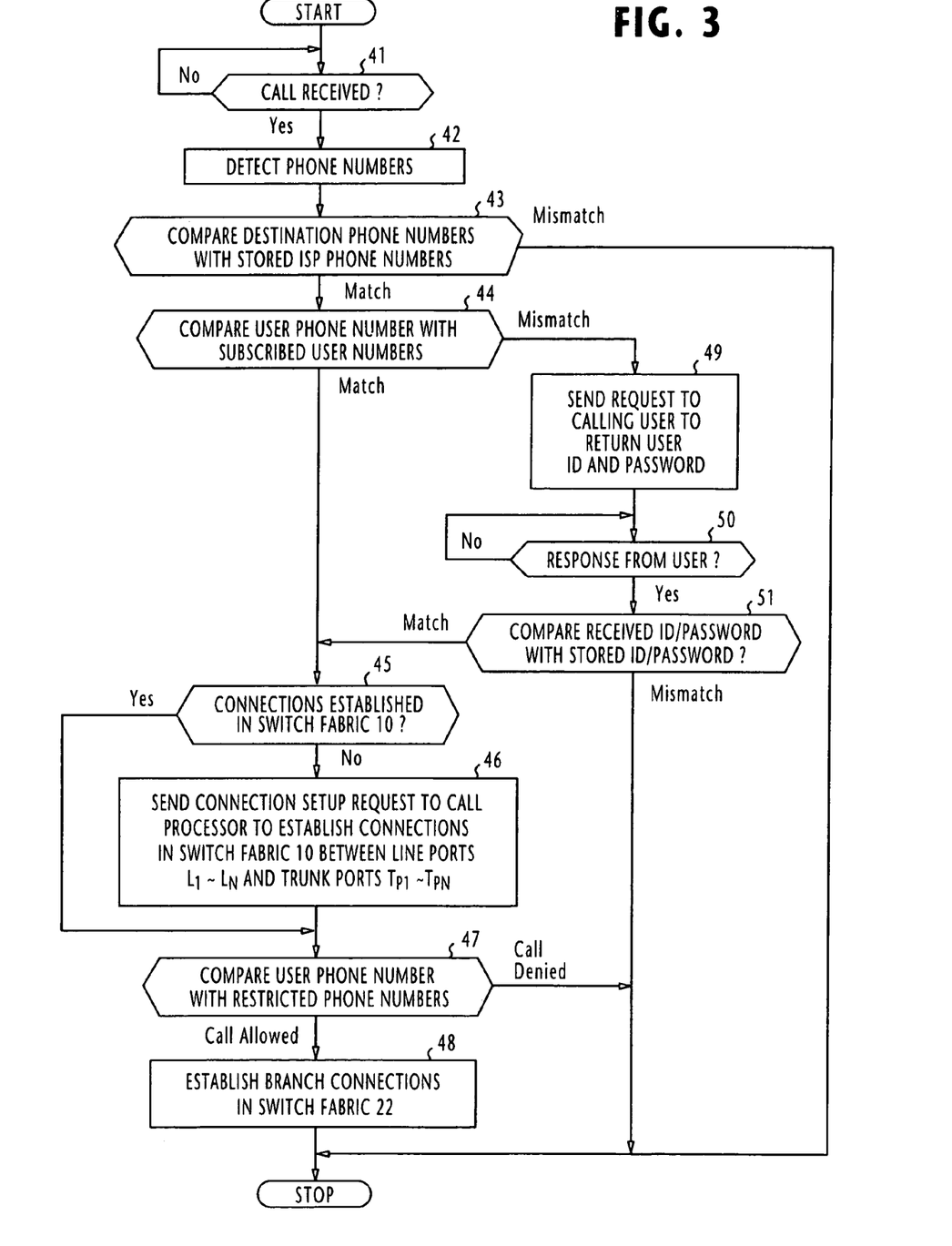
FIG. 3 is a flowchart of the control unit of the branch connection apparatus.

The operation of processor 30 proceeds according to a programmed routine described in the flowchart of FIG. 3. When a call is received from a user terminal (step 41), the processor 30 proceeds to detect all phone numbers contained in the data received from the line interface 20 of the calling user terminal (step 42). At step 43, the phone number of the calling user is checked against phone numbers stored in the ISP phone number memory 31. If they mismatch with the stored ISP phone numbers, the processor 30 recognizes that the request cannot be accepted and terminates the routine. Otherwise, the processor advances to next decision step 44 to compare the phone number of the calling user with the phone numbers stored in the user phone number memory 32 to determine whether the calling user is authorized to gain access to the Internet.

If it is determined that the calling user is an authorized subscriber, the processor 30 proceeds from step 44 to step 45 to determine whether desired connections are already established in the switch fabric 10. If not, the processor 30 proceeds to step 46 to send a connection setup request to the call processor 11 to establish connections in the switch fabric 10 between line ports $L_1 \sim L_N$ and trunk ports $T_{P1} \sim T_{PN}$. The number of such connections is determined by the phone numbers contained in the user's connection request. At step 47, the processor 30 communicates through the line interface units 24 to obtain call restriction data and compares the phone number of the calling user with the phone numbers contained in the restriction data. If there is a mismatch, the processor 30 recognizes that the user is denied access to the Internet. Otherwise, the processor 30 recognizes that the user is allowed to access the Internet and proceeds to step 48 to control the switch fabric 22 to establish a set of branch connections between one of the diverging ports of the switching unit 16 and a number of converging ports determined by the phone numbers of Internet service providers contained in the received packet.

If the decision at step 45 is affirmative, the processor 30 skips step 46. With the connections established in both switch fabrics 10 and 22, the routine is then terminated.

If the decision at step 44 indicates that there is a mismatch between the calling user's phone number and the subscribed phone numbers, flow proceeds to step 49 to send a request packet to the calling user terminal via the associated line interface unit 20 to return a response containing a user's identifier (ID) and a user's password. If a response is returned (step 50), the processor 30 compares the data stored in the user ID/password memory 33 (step 51). If a match is detected in step 51, the processor proceeds to step 45. Otherwise the routine is terminated.

It will be seen from the foregoing that, if the user terminal $12_1$ initially sends a connection request packet to the network, requesting a set of N "branch connections" to internet service providers $13_1 \sim 13_N$. If the requesting user is authenticated, N paths are established in the switch fabric 10 between line ports $L_1 \sim L_N$ and trunk ports $T_{P1} \sim T_{PN}$ and a set of N branch connections is established in the switching unit 16 between the diverging port $D_1$ and the converging ports $C_1 \sim C_N$, as indicated by thick dotted lines in FIG. 1. If the user terminal $12_2$ subsequently sends a connection, requesting an identical set of branch connections, and is then authenticated, a set of branch connections is established in the switch fabric 22. In the latter case, necessary connections are already established in the switch fabric 10. Thus, step 46 is skipped.

As a result, (2×N) paths are set up in the switching unit 16 and (2+N) paths are set up in the switch fabric 10 for the user terminals $12_1$ and $12_2$. If these connections were established without using the branch connection apparatus 15, (2×N) paths must be established in the switch fabric 10. If there are M user terminals simultaneously requesting identical branch connections for N internet service providers, (M×N) paths will be established in the switching unit 16 and (M+N) paths will be established in the switch fabric 10. Since in most cases the product (M×N) is considerably greater than the sum (M+N), the branch connection apparatus 15 can significantly relieve the switch fabric 10 of the burden of establishing "branch-connection" paths.

In addition, each of the transmission (access) lines between the switch fabric 10 and the internet service providers 13 is always lightly loaded with traffic. Therefore, the access line of each internet service provider can support the multiplexed traffic of a number of user terminals. Further, due to the significant increase in the utilization efficiency of the access lines, internet service providers are relieved of the burden of paying high access charges for providing flat rate services to internet subscribers.

In a modified embodiment, the converging ports of the branch connection apparatus 15 may be connected direct to the internet service providers.

Figure 4:
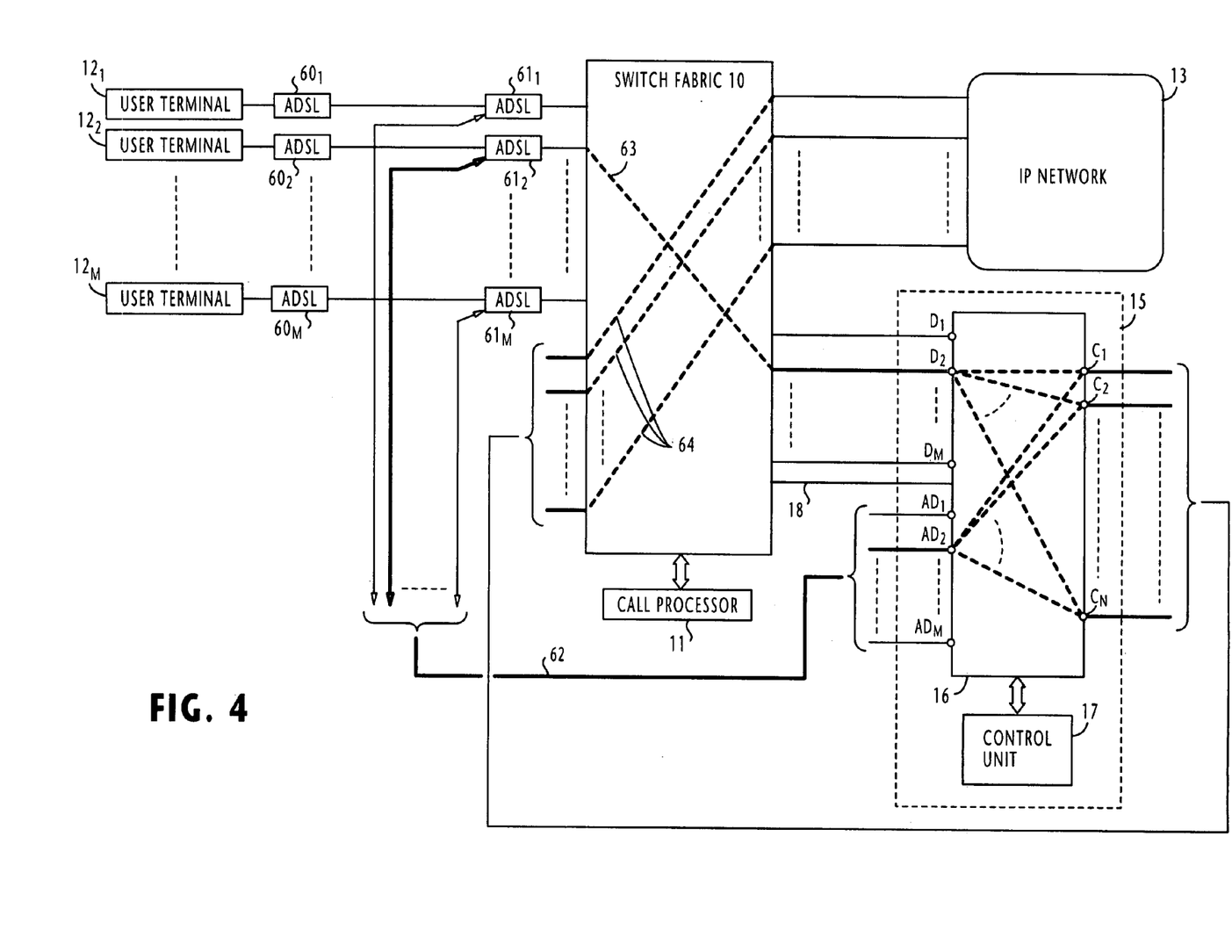
FIG. 4 is a block diagram of a communication network in which the branch connection apparatus of this invention is combined with high speed interfaces such as asymmetric digital subscriber lines.
Figure 5:
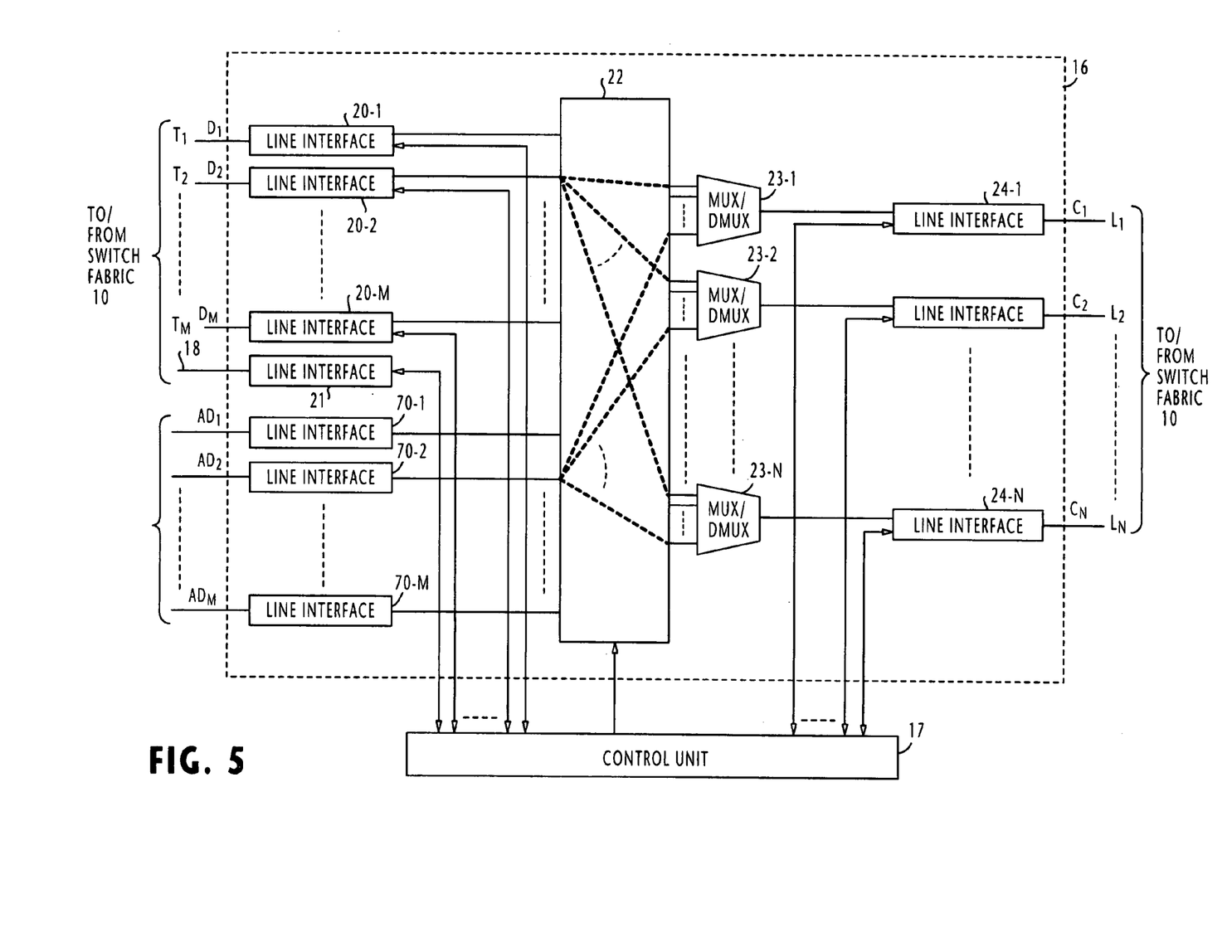
FIG. 5 is a block diagram of the branch connection apparatus of FIG. 4.

FIGS. 4 and 5 illustrate a modified embodiment of the present invention in which the end points of subscriber access lines are terminated with ADSL (asymmetric digital subscriber line) modems $60_1 \sim 60_M$ and $61_1 \sim 61_M$. High speed signals from the ADSL modems $61_1 \sim 61_M$ are connected by lines 62 to converging ports $AD_1 \sim AD_M$ of the switching unit 16 and their low speed signals such as speech signals are supplied to corresponding line ports of the switch fabric 10 for transmission over the Internet using a protocol known as VoIP (voice over IP). High speed signals at the diverging ports $AD_1 \sim AD_M$ are coupled through line interface units 70-1~70-M (FIG. 5) to line ports of the switch fabric 22.

If the user terminal $12_2$ sends a connection request to the network, requesting a conference call, for example, and ADSL connections to different internet service providers, the call processor 11 establishes a connection 63 in the switch fabric 10 between the ADSL modem $61_2$ and the diverging port $D_2$ of the switching unit 16. The connection request is passed on from the call processor 11 to the processor 30 via the control line 18. In response, the processor 30 requests the call processor 11 to establish connections 64 in the switch fabric 10 and then establishes a first set of branch connections between the diverging port $D_2$ and the converging ports $C_1 \sim C_N$ and a second set of branch connections between the diverging port $AD_2$ and the converging ports $C_1 \sim C_N$. The speech signal of user terminal $12_2$ is split at the diverging port $D_2$ and the high speed signal of the user is split at the diverging port $AD_2$. At the converging ports $C_1 \sim C_N$, the split speech signals and the split high speed signals are multiplexed and transmitted to the IP network 13 through the connections 64.

What is claimed is:

1. A connection apparatus for a public network switching system, the switching system having a first plurality of line ports to which a plurality of user terminals are connected, a second plurality of line ports, a first plurality of trunk ports to which a plurality of Internet lines are connected, and a second plurality of trunk ports, the apparatus comprising:

a switching unit having a plurality of diverging ports adapted for connection to said second plurality of trunk ports and a plurality of converging ports adapted for connection to said second plurality of line ports; and a control unit responsive to a request signal from one of said user terminals for establishing in said switching unit a plurality of connections specified by said request signal between one of said diverging ports and a plurality of said converging ports, wherein said public network switching system establishes a connection between said one diverging port and said one user terminal and a plurality of connections between said second plurality of line ports and said first plurality of trunk ports corresponding in number to said plurality of connections established in said switching unit.

2. The connection apparatus of claim 1, wherein at least one of said plurality of converging ports includes a multiplexer for multiplexing a plurality of user signals into a signal for transmission to one of said Internet lines.

3. The connection apparatus of claim 2, wherein at least one of said plurality of converging ports further includes a demultiplexer for demultiplexing a signal from said one Internet line into a plurality of signals for application to said diverging ports.

4. The connection apparatus of claim 3, wherein said demultiplexer is configured to operate in a TCP/IP protocol mode.

5. The connection apparatus of claim 2, wherein said multiplexer is configured to operate in a TCP/IP protocol mode.

6. The connection apparatus of claim 2, wherein each of said plurality of diverging ports includes a first line interface unit for interfacing the switching unit to said switching system and each of said converging ports further includes a second line interface unit for interfacing the multiplexer to said one Internet line.

7. The connection apparatus of claim 6, wherein said second line interface unit is in compliance with the communication protocol and transmission speed of one of said user terminals.

8. The connection apparatus of claim 6, wherein each of said plurality of converging ports further includes a demultiplexer for demultiplexing a signal from said one Internet line into a plurality of signals for application to said diverging ports and wherein said second line interface unit is configured to interface the demultiplexer to said one Internet line.

9. The connection apparatus of claim 1, wherein said control unit comprises:
   a phone number memory for storing a plurality of phone numbers; and
   a processor for determining whether a phone number contained in said request signal coincides with one of said phone numbers stored in said phone number memory and establishing said plurality of connections in said switching unit if the phone number coincides with one of the stored phone numbers.

10. The connection apparatus of claim 9, wherein said control unit further comprises an ID and password memory for storing a plurality of user identifiers and user passwords, and wherein said processor is configured to:
   determine whether a user identifier and a user password contained in said request signal coincide with one of the user identifiers and one of the user passwords stored in said ID and password memory if the phone number contained in said request signal does not coincide with any of the stored phone numbers, and
   establish said plurality of connections in said switching unit if the user identifier and the user password contained in the request signal coincide with one of the stored user identifiers and one of the stored user passwords.

11. The connection apparatus of claim 10, wherein said processor is configured to:
   determine whether the phone number contained in said request signal coincides with a phone number which is denied access to the Internet lines, and
   establish said plurality of connections in said switching unit if the phone number contained in said request signal does not coincide with said phone number which is denied access to the Internet lines.

12. The apparatus of claim 1, wherein the control unit establishes a plurality of connections in said switching unit between one of said diverging ports in communication with said user terminal and a plurality of converging ports.

13. The apparatus of claim 12, wherein the number of said plurality of connections in said switching unit is based upon a number of Internet lines specified by said request signal.

14. A connection apparatus for a public network switching system which serves user terminals via a plurality of ADSL (asymmetric digital subscriber line) modems, said switching system having a first plurality of line ports to which said ADSL modems are connected, a second plurality of line ports, a first plurality of trunk ports to which a plurality of Internet lines are connected, and a second plurality of trunk ports, the apparatus comprising:
   a switching unit having a first plurality of diverging ports adapted for connection to said second plurality of trunk ports, a second plurality of diverging ports adapted for connection to said ADSL modems, and a plurality of converging ports adapted for connection to said second plurality of line ports; and
   a control unit responsive to a request signal from one of said ADSL modems for establishing in said switching unit a first plurality of connections between one of said first plurality of diverging ports and a plurality of said converging ports specified by said request signal and a second plurality of connections between one of said second plurality of diverging ports and a plurality of said converging ports,
   wherein said public network switching system establishes a connection between said one ADSL modem and said one of said first plurality of diverging ports and a plurality of connections between said second plurality of line ports and said first plurality of trunk ports corresponding to said first plurality of connections established in said switching unit.

15. A communication system comprising:
   a public network switching system having a first plurality of line ports to which a plurality of user terminals are connected, and a first plurality of trunk ports to which a plurality of Internet lines are connected, and a second plurality of trunk ports;
   a switching unit having a plurality of diverging ports connected to said second plurality of trunk ports and a plurality of converging ports connected to a second plurality of line ports; and
   a control unit responsive to a request signal from one of said user terminals for establishing in said switching unit a plurality of connections specified by said request signal between one of said diverging ports and a plurality of said converging ports,
   said public network switching system establishing a connection between said one diverging port and said one user terminal, and a plurality of connections between said second plurality of line ports and said first plurality of trunk ports corresponding to said plurality of connections established in said switching unit.

16. A communication system comprising:
   a plurality of ADSL (asymmetric digital subscriber line) modems;
   a public network switching system having a first plurality of line ports to which said ADSL modems are connected, a second plurality of line ports, a first plurality of trunk ports to which a plurality of Internet lines are connected, and a second plurality of trunk ports;
   a switching unit having a first plurality of diverging ports connected to said second plurality of trunk ports, a second plurality of diverging ports connected to said ADSL modems, and a plurality of converging ports connected to said second plurality of line ports; and
   a control unit responsive to a request signal from one of said ADSL modems for establishing in said switching unit a first plurality of connections between one of said first plurality of diverging ports and a plurality of said converging ports specified by said request signal and a second plurality of connections between one of said second plurality of diverging ports and a plurality of said converging ports,
   said public network switching system establishing a connection between said one ADSL modem and said one of said first plurality of diverging ports and a plurality of connections between said second plurality of line ports and said first plurality of trunk ports corresponding to said first plurality of connections established in said switching unit.

17. A method of communication for a public network switching system by using a switching unit, said public network switching system having a first and second plurality of line ports, and a first and second plurality of trunk ports, and said switching unit having a plurality of diverging ports and a plurality of converging ports, wherein a plurality of user terminals are connected to said first plurality of line ports and a plurality of Internet lines connected to said first plurality of trunk ports, the method comprising:
  connecting said plurality of diverging ports to said second plurality of trunk ports;
  connecting said plurality of converging ports to said second plurality of line ports;
  receiving a request signal from one of said user terminals via one of said first plurality of line ports;
  establishing, in said public network switching system, a connection between said one of said first plurality of line ports and one of said second plurality of trunk ports and a plurality of connections specified by said request signal between said second plurality of line ports and said first plurality of trunk ports; and
  establishing, in said switching unit, a plurality of connections between one of said diverging ports and a plurality of said converging ports corresponding to plurality of connections established in said public network switching system, said one of said diverging ports being connected to said one of said second plurality of trunk ports.

18. A control unit for a public network switching system, the switching system having a first plurality of line ports to which a plurality of user terminals are connected, a second plurality of line ports, a first plurality of trunk ports to which a plurality of Internet lines are connected, and a second plurality of trunk ports and having a switching unit having a plurality of diverging ports adapted for connection to said second plurality of trunk ports and a plurality of converging ports adapted for connection to said second plurality of line ports, the control unit comprising:
  a phone number memory for storing a plurality of phone numbers; and
  a processor for determining whether a phone number contained in a request signal coincides with one of said phone numbers stored in said phone number memory and establishing a plurality of connections between at least one diverging port and a plurality of converging ports in a switching unit if the phone number coincides with one of the stored phone numbers,
  wherein the public network switching system establishes a connection between said at least one diverging port and one of said plurality of user terminals and a plurality of connections between said second plurality of line ports and said first plurality of trunk ports corresponding in number to said plurality of connections established in said switching unit.

* * * * *